United States Patent [19]

Milkowski et al.

[11] Patent Number: 5,928,689
[45] Date of Patent: *Jul. 27, 1999

[54] METHOD FOR TREATING PSE MEAT WITH TRANSGLUTAMINASE

[75] Inventors: Andrew L. Milkowski, Madison, Wis.; Andrzej A. Sosnicki, Hendersonville, Tenn.

[73] Assignee: Kraft Foods, Inc., Northfield, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/659,696

[22] Filed: Jun. 5, 1996

[51] Int. Cl.$^6$ ........................................ A23L 1/314
[52] U.S. Cl. ................................. 426/56; 426/641
[58] Field of Search ........................ 426/56, 7, 57, 426/74, 641–646, 52, 59, 58

[56] References Cited

U.S. PATENT DOCUMENTS

| | | | |
|---|---|---|---|
| 4,190,100 | 2/1980 | Wallace | 165/48 R |
| 4,551,338 | 11/1985 | Wallace | 426/281 |
| 4,917,904 | 4/1990 | Wakameda et al. | |
| 5,085,615 | 2/1992 | Gundlach et al. | |
| 5,518,742 | 5/1996 | Soeda et al. | 426/59 X |
| 5,686,124 | 11/1997 | Moller et al. | 426/56 |

FOREIGN PATENT DOCUMENTS

| | | |
|---|---|---|
| 0333528 | 9/1989 | European Pat. Off. |

OTHER PUBLICATIONS

L.L. Borchert and E.J. Briskey, "Prevention of Pale, Soft, Exudative Porcine Muscle Through Partial Freezing with Liquid Nitrogen Post–Mortem", *Journal of Food Science*, 1964, vol. 29, No. 2, pp. 203 to 209.

E.J. Briskey, "Etiological Status and Associated Studies of Pale, Soft, Exudative Porcine Musculature", *Advances in Food Research*, vol. 13, 1964, pp. 159 to 167.

Ajinomoto KK, "Minced meat and fish paste", Oct. 1990, Abstract of JP 2255060.

Taiyo Fishery KK; Ajinomoto KK, "Ground fish meat from fish contg. protozoa", Apr. 1990, Abstract of JP 2100655.

Taiyo Fishery KK; Ajinomoto KK, "Novel ground meat of 'okiami'", Apr. 1990, Abstract of JP 2100654.

Ajinomoto KK; Taiyo Fishery Co Ltd, "Prepn. of fish meat paste avoiding use of phosphate salts", Apr. 1990, Abstract of JP 2100653.

Ajinomoto KK; Ajinmoto Reitoshokuhin, "Material for frozen granular meat", Apr. 1990, Abstract of JP 2100651.

Ajinomoto KK, "Seasonings contg. trans–glutaminase", Mar. 1990; Abstract of JP 2086748.

Ajinomoto KK; Fine Foods Kenkyu Kyodo, "Prepn. of moulded meat", Mar. 1990, Abstract of JP 2079956.

Biochem Inst Pallad, "Medium for activating trans–glutaminase", Dec. 1988, Abstract of SU 1446158.

Bongrain SA, "Fermentation process using transformed microorganisms", Aug. 1989, Abstract of WO 8907398.

Snow Brand Milk Products, "Enriching proteinaceous materials using transglutaminase to introduce amino acid", Feb. 1983, Abstract of JP58028234.

"Transglutaminase Mediated Poymerization of Crude Actomysin Refined From Mechanicall Deboned Poultry Meat", Akamittath and Ball, *Journal of Muscle Foods 3* (1992), 1991, pp. 1–14.

"Strength of Protein Gels Prepared with Microbial Transglutaminase as Related to Reaction Conditions", Sakamoto et al, *Journal of Food Science*, vol. 59, No. 4, 1994, pp. 866–871.

"Reactions and Potential Industrial Applications of Transglutaminase Review of Literature and Patents.", Neilson, Enzyme Development and Applications, *Food Biotechnology*, 9(3), 1995, pp. 119–156.

Ajinomoto KK, "Preparation of feedstuff for animals having meat flavour", Sep. 1994, Abstract of JP 6261692.

Novo–Nordisk AS, "Non–acidified milk–based gels prodn", Sep. 1994, Abstract of WO 9421130.

Novo–Nordisk AS, "Acidified edible milk–based gels prodn", Sep. 1994, Abstract of WO 9421129.

Ajinomoto KK, "Fish paste prod. prodn. for sausages or hamburgers", Aug. 1994, Abstract of JP 6225729.

Ajinomoto KK, "Prodn. of ground meat for mfr. of hamburgers", Jul. 1994, Abstract of JP 6197738.

Ajinomoto KK, "Enzyme prepn. for paste food for making fish burgers etc", Apr. 1994, Abstract of JP 6113796.

Taiyo Kagaku KK, "Prepn. of meat food e.g. ham, bacon, sausage, without excessive amt. of phosphate", Apr. 1994, Abstract of JP 6090710.

Ajinomoto KK, "Agent fo improving colour of heat", Aug. 1993, Abstract of JP 5207864.

Ajinomoto KK, "Canned meat prod. mfr.", Sep. 1991, Abstract of JP 3210144.

*Primary Examiner*—Arthur L. Corbin
*Attorney, Agent, or Firm*—Lockwood, Alex, Fitzgibbon & Cummings

[57] ABSTRACT

The invention is directed to a process for improving the quality of pale, soft and exudative meat by treating meat with transglutaminase enzyme. The invention is particularly well suited for manufactured pork and turkey breast products such as canned or packaged hams and turkey breasts. The manufactured meat products have reduced cooking purge, improved binding of the muscle pieces and firmer texture.

20 Claims, No Drawings

METHOD FOR TREATING PSE MEAT WITH TRANSGLUTAMINASE

FIELD OF THE INVENTION

The present invention relates generally to the processing of raw meat and especially to a procedure which may be used to lessen, reverse or repair the inferior properties of pale, soft and exudative meat, thereby improving the quality of meat which has developed such PSE properties.

BACKGROUND OF THE INVENTION

The terms "pale, soft and exudative" are terms of the art generally understood as referring to certain undesirable characteristics of cuts or chunks of fresh meat. The terms relate to a preference evaluation and do not denote or suggest that such meat is less wholesome, inedible or unusable. Meat which is developing or has developed pale, soft and exudative characteristics may be termed PSE meat. Another category of meat is that which has dark, firm and dry or non-exudative characteristics, which can be described as DFD meat. The term "normal" meat as used herein refers to meat which is acceptable in a preference selection and whose characteristics are subjectively generally between PSE meat and DFD meat.

The pale characteristic refers to a reduction in color intensity of ground meat or of a fresh cut or chunk of meat. A chunk of meat can be defined as a fresh cut of meat which has been subdivided into pieces having a dimension of about 1 inch or more. For example, when the fresh meat cut is ham, good color intensity is one wherein the ham has a darkish pink-to-red color. In contrast, a pale ham is one that has a dull and light grayish coloration. Generally speaking, a so-called pale ham is less desirable and is of a lower commercial value than a ham having a more intense coloration. A cut or chunk of meat exhibiting a soft texture is one that is not particularly firm. This condition expresses itself in finished pieces of meat, for example, hams, as a quality which makes it difficult to cut such meat into thin slices. The exudative quality refers to the inability of cuts or chunks of meat to hold water.

A pale, soft and exudative (PSE) muscle cut or chunk or grind of meat is thus one which has a pale color, soft texture and a reduced capacity for holding water. A cut or chunk or grind of meat which does not have PSE characteristics has a noticeably darker color and a firmer texture because the muscle protein is less denatured than in a PSE muscle. A muscle cut or chunk or grind which does not exhibit noticeable PSE characteristics also has a greater water holding capacity so that the moisture remains within the meat, even when cut or sliced, rather than exude therefrom over the passage of time.

A suggested reason for the occurrence of pale, soft and exudative characteristics is that lactic acid is rapidly generated post-mortem in the carcass. The lactic acid is believed to accumulate within the meat components and rapidly lower the pH of such meat. This fast lactic acid generation and fast pH lowering is believed to cause or at least contribute to the damaging or denaturing of muscle protein, thereby resulting in the appearance or occurrence of the PSE condition.

A number of approaches have been described in the art to prevent the development of the PSE condition. Exemplary references include U.S. Pat. Nos. 4,190,100 and 4,551,338 to Wallace; Borchet et al., "Prevention of Pale, Soft Exudative Porcine Muscle Through Partial Freezing with Liquid Nitrogen Post-Mortem", J. Food Science 29 (2): 203–209 (1964); and E. J. Briskey, "Etiological Status and Associated Studies of Pale, Soft, Exudative Porcine Musculature", Adv. Food Research, 13: 159–167 (1964). More recently, U.S. Pat. No. 5,085,615 to Gundlach et al. described the use of solid carbon dioxide to reduce the development of PSE characteristics in freshly killed meat.

While the above cited-art describes various methods of preventing the development of PSE characteristics in meat, none of them describe a procedure for lessening, reversing or repairing the effects of PSE once it has occurred. That is, the art does not describe a process whereby meat cuts or chunks or grinds which have developed or begun to develop PSE characteristics may be treated to lessen, reverse or repair the PSE process or the effects of the PSE process such that the quality of pale, soft and exudative (PSE) meat improves and becomes more nearly like those of normal meat.

A number of patents or publications teach the use of the enzyme transglutaminase (hereafter TG), also known as glutamate transaminase, to improve the water retention and texture of fish, fowl and animal meats, particularly ground or minced meats, soybean protein, egg albumin and casein containing products. However, none of these patents or publications teach the use of TG to lessen, reverse or repair the PSE condition in meat, or to improve the cohesiveness and firmness of meat products which exhibit the PSE condition or PSE characteristics. Furthermore, none of these patents or publications teach the use of TG to further improve the quality of chunks of normal meat or fowl, or to further improve the cohesiveness and firmness of products manufactured from normal meat or fowl relative to products manufactured without the use of TG.

For example, U.S. Pat. No. 4,917,904 to Wakameda et al. describes a process whereby TG is added to various meats, soybean protein, egg albumin or casein-containing mixtures to improve the texture thereof. Specifically, Wakameda et al. describe adding TG to ground fish meat, minced fish meat, fillet and lyophilized fish powder, ground or minced animal meat, and fowl and block meat to improve the water retention of the final ground or minced meat product. However, Wakameda et al. state that while TG enhances the water retention in such animal meat and fowl, the texture thereof becomes hard to masticate or chew. This difficulty in chewing the product is an undesirable property. Wakameda et al. do not teach the use of TG to lessen, reverse or repair the PSE condition or the effects of the PSE condition.

Examples of publications discussing TG effects include "Transglutaminase Mediated Polymerization of Crude Actomyosin Refined From Mechanically Deboned Poultry Meat", Akamittath and Ball, *Journal of Muscle Foods* 3, 1992, 1–14; and "Strength of Protein Gels Prepared With Microbial Transglutaminase as Related to Reaction Conditions", Sakamoto, Kumazawa and Motoki, *Journal of Food Science*, Volume 59, No. 4, 1994.

European published patent application 0 333 528 describes the genetic alteration of micro-organisms to produce TG and the addition of such genetically altered micro-organisms to ground meats to improve the texture of the ground meat when it is cooked. Generally, the genetically altered micro-organisms are described as being used with ground beef, soya, and casein, among other substances, to prepare ground meat products, sausages and cheeses. This publication does not teach the use of the TG-producing micro-organisms to lessen, reverse or repair the PSE condition or the effects of the PSE condition.

Japanese patent publications describing the use of TG are No. 06261692A (preparation of animal feeds by allowing TG to act upon the meat of animals, fish and/or their by-products which are used as such feeds); No. 6225729A (addition of TG to ground fish or cattle meat); No. 6197738A (addition of TG to ground meat for making hamburgers); No. 6113796A (addition of TG to paste food for making sausages or hamburgers of fish meats); No. 6090710A (using thrombin in combination with plasma protein, fibrinogen concentrate, fibrinogen or transglutaminase plasma); No. 5207864A (use of transglutaminase to improve meat color); No. 3210144A (use of transglutaminase with canned, or potted meat, fish, crab and scallop products); No. 2255060A (adding transglutaminase to minced meat or fish paste products); No. 2100655A (addition of transglutaminase to ground fish meat); and No. 2100654A (addition of transglutaminase to ground 'okiama' (Euphausia superba) fish to improve the water retention and smoothness of the finished ground product). Additional Japanese patent publications describing the use of transglutaminase are Nos. 2100653A, 2100651A, 2086748A and 2079956A, all of which describe the use of transglutaminase with ground fish or meat pastes.

While TG has been described in the above cited art as improving selected characteristics of ground meat products and some non-meat, protein-containing products, this art does not describe the use of TG to lessen, repair or reverse the PSE condition or the effects of PSE on whole cuts or chunks of meat.

Accordingly, it is a general object of the present invention to provide a procedure for lessening, reversing or repairing the PSE condition or the effects of PSE in meat and/or meat products.

Another object of the present invention is to provide a process for lessening, reversing or repairing the PSE condition or the effects of the PSE condition in whole cuts or chunks of fowl and porcine muscle and/or products manufactured from such chunks of fowl and pork.

Another object of the invention is to provide a process for lessening, reversing or repairing the PSE condition or the effects of PSE in whole cuts or chunks of porcine muscle, turkey breast and chicken breast, and products manufactured using such chunks of pork, turkey breast and chicken breast.

Another object of the invention is to provide a process for lessening, reversing or repairing the PSE condition or the effects of PSE in smoked or unsmoked porcine muscle, turkey breast and chicken breast, and products manufactured using same.

SUMMARY OF THE INVENTION

The invention comprises a process for improving the quality of pale, soft and exudative meat by use of a transaminase enzyme. In particular, the invention including a process utilizing an aqueous solution comprising the enzyme transglutaminase, also known as glutamate transaminase, to treat meat having pale, soft and exudative characteristics or conditions in order to lessen, reverse or repair such characteristics or the effects of such characteristics. The invention is particularly well suited as a process which may be used to treat whole cuts or chunks of pig meat and fowl which exhibit PSE characteristics and which are to be cooked and/or smoked. The invention further is particularly useful in the preparation of manufactured meat and/or fowl products utilizing porcine muscle, turkey breast or chicken breast including whole cuts or chunks; for example, canned or packaged ham, turkey breast or chicken breast made from whole cuts or chunks of such meats.

DETAILED DESCRIPTION OF THE INVENTION

Meats, particularly hams (porcine muscle) and fowl meat, at times exhibit a quality-reducing phenomenon that leads to what is termed as pale, soft and exudative (PSE) meat. Under certain conditions, a high quality piece of meat will become pale, soft and exude moisture to give an unappetizing appearance. While the meat exhibiting such an appearance may be wholesome and edible, subjectively it is less desirable than meat which does not present such an appearance. The present invention describes a process comprising treating meat which exhibits such PSE characteristics with a solution containing a transaminase enzyme to restore the normal functionality of such meat. In particular, the present invention describes a process comprising treating meat such as porcine muscle and turkey breast which exhibit PSE characteristics with a solution containing a transaminase enzyme to restore the normal functionality of such meat.

The enzyme transglutaminase (glutamate transaminase; R-glutaminyl peptide amine γ-glutamyl transferase; protein-glutamine, amine-γ-glutamyltransferase) or TG is a $Ca^{+2}$ dependent enzyme which catalyzes crosslinking reactions in meat and plant proteins. These reactions lead to the formation of intra- and inter-molecular covalent bonds which are significantly stronger than normal hydrogen bonding between proteins. The protein crosslinking process which occurs with the use of TG results in "setting" a meat (or fowl) or meat (or fowl) gel without cooking, thus restoring normal functionality to low quality PSE meat; that is, improving the characteristics of the meat or fowl away from the PSE level and toward the ideal DFD or the normal level.

In the meat industry, poor extractibility of myofibrillar proteins is usually associated with reduced processing yields, soft texture and poor cohesiveness in products such as canned or packaged hams, turkey breasts and chicken breasts made from PSE meat. As taught herein, the TG-catalyzed formation of intra- and inter-molecular covalent bonds produces crosslinked polymers of myofibrillar proteins, thereby restoring at least normal functionality to PSE meat. Since the ability to crosslink muscle protein is an essential process in building the structure of muscle foods, TG catalyzed crosslinking can considerably improve the quality of products made from PSE meat. In addition, the "setting" process achieved through the use of TG can be used to improve the quality of low salt and blended meat products.

Although it is preferable that the TG used in practicing the invention be a highly purified product, crude products such as those obtained from bovine, equine and swine plasma or liver extracts may also be used. Those obtainable as bacterial preparations or fermentations may be used as well.

The TG used in the examples given herein was obtained from Sigma Chemical Company, St. Louis, Mo. (catalogue number T5398; Enzyme Commission [EC] Number EC 2.3.2.13, guinea pig liver). The enzyme was purchased as vials containing 0.5 unit TG per vial. The TG containing solutions used herein were prepared by combining 21 ml distilled water with the contents of each vial to give a TG solution containing 0.0238 units of TG per ml of solution.

The tests and examples described herein were conducted using (1) DFD, normal and PSE turkey breast and (2) normal and PSE pig quadriceps muscles. The breast or muscle was chosen based on Minolta™ color values (L*) as shown in Table 1. The L* values shown in Table 1 were determined using whole cuts or chunks of meat. An L* value greater than 50 signifies PSE meat. The pH of the meat was determined, as ground meat, at 72 hours post mortem (Table 1).

TABLE 1

Minolta ™ Lightness (L*) and pH of 72-Hour Post-Mortem DFD, Normal and PSE Turkey Breast and Pig Quadriceps Muscles Before Cooking

| Muscle | L* | pH$_{72}$ |
| --- | --- | --- |
| DFD Turkey Breast | 37.5 | 6.23 |
| Normal Turkey Breast | 46.0 | 5.86 |
| PSE Turkey Breast No. 1 | 54.5 | 5.63 |
| PSE Turkey Breast No. 2 | 55.5 | 5.58 |
| Normal Pig Quadriceps | 38.0 | 6.25 |
| PSE Pig Quadriceps No. 1 | 55.5 | 5.39 |
| PSE Pig Quadriceps No. 2 | 54.5 | 5.21 |

To model a commercial, manufactured meat product such as a canned or cook-in packaged ham or turkey breast, a 97.5 g sample of meat was ground and mixed with 2.0 g NaCl and 0.5 g sodium tripolyphosphate to form a uniform 2.0% salt, 0.5% phosphate batter. A 3 ml sample of the TG solution, prepared as described above, was added to a 15 g sample of meat batter prepared from each of the meats listed in Table 1. The final TG concentration in each batter sample was 0.02 unit/g of meat protein. (Typically, lean meat contains about 20–25% protein). Control samples were prepared in a similar manner using DFD, normal and PSE meat, 3 ml of distilled water and no TG enzyme. Control and test samples were cured or incubated at 38° F. (about 3° C.) for 40 hours. After curing was completed, they were evaluated using an excess water holding capacity (WHC)/cooking yield (CY) assay. Results were calculated as a percentage of water (or salt solution) held by 10 g of meat after centrifugation (WHC) and cooking (CY). The results obtained using these models also may be used to process whole cuts or chunks of meat which are to be used in the manufacture of canned or packaged meats products.

With more particular reference to the water holding capacity and cooking yield assay, excess or gross water binding is a measure of the extra swelling capacity of meat prior to cooking and is thereby a measure of the quantity and/or quality of functional protein. This gross water holding capacity is calculated by a procedure whereby the percent cookout is determined and is used as a measure of meat quality with respect to cooking when proteins are maximally hydrated.

The results of the water holding capacity and cooking yield (WHC/CY) assays on the test and the control samples are shown in Tables 2 and 3. On the average, water holding capacity and cooking yield for the TG-treated PSE turkey breast and PSE pork increased approximately 33% and 19%, respectively, relative to the control sample of the respective PSE meat. The Tables further indicate that water holding capacity and cooking yield for TG-treated normal turkey breast and pork increased 62% and 49%, respectively, relative to the corresponding control samples.

TABLE 2

Effect of TG on Excess Water Holding Capacity of DFD, Normal, and PSE Turkey Breast and Pig Quadriceps Muscles

| Muscle | Excess Water Holding Capacity, % | |
| --- | --- | --- |
| | TG-Treated Meat | Control |
| DFD Turkey Breast | 136.0 | 90.5 |
| Normal Turkey Breast | 143.0 | 82.4 |
| PSE Turkey Breast No. 1 | 113.0 | 60.2 |
| PSE Turkey Breast No. 2 | 95.0 | 74.2 |
| Normal Pig Quadriceps | 171.0 | 108.1 |
| PSE Pig Quadriceps No. 1 | 93.4 | 55.4 |
| PSE Pig Quadriceps No. 2 | 62.4 | 40.8 |

TABLE 3

Effect of TG on the Cooking Yield of DFD, Normal and PSE Turkey Breast and Pig Quadriceps Muscles

| Muscle | Cooking Yield, % | |
| --- | --- | --- |
| | TG-Treated Meat | Control |
| DFD Turkey Breast | 152.0 | 124.3 |
| Normal Turkey Breast | 148.2 | 104.8 |
| PSE Turkey Breast No. 1 | 132.4 | 95.8 |
| PSE Turkey Breast No. 2 | 113.2 | 108.6 |
| Normal Pig Quadriceps | 178.6 | 124.9 |
| PSE Pig Quadriceps No. 1 | 117.6 | 96.0 |
| PSE Pig Quadriceps No. 2 | 100.1 | 86.6 |

The amount of TG used in practicing the invention may range between an effective amount and an amount that is economically justified, with increasing amounts decreasing the treatment time in a substantially linear manner. Typical concentrations can range from about 0.005 unit/g of meat protein being processed to about 10 units/g of meat protein. A typical range of TG is between about 0.02 and about 5 units/g of meat protein. When costs are not prohibitive, an advantageous amount is between about 1 and about 5 units/g of meat protein. The time for which the meat is cured or incubated in a TG containing solution may range from about 160 hours to about 5 minutes. The exact time will be dependent of the amount or concentration of TG in the processing solution. Generally, when the TG is present in an amount of about 0.02 unit/g meat protein being processed, a curing or incubating time of about 24–48 hours is used in practicing the invention. The curing or incubating temperature may be in the range of about 32–45° F. A temperature of about 38° F. is especially preferred. TG treatments can incorporate known procedures for facilitating physical distribution of fluids with respect to meats, such as tumbling, mixing and/or maceration.

The following examples are given to illustrate the invention and are not limiting. Those skilled in the art will recognize the value of the invention and the variations in the way in which it can be practiced. The vessels used for treating and/or curing and the procedures used for treating the meat or fowl with the TG-containing solution, placing the treated meat or fowl in containers, forms, moulds or cook-in bags, and cooking and/or smoking the contained or moulded meat are standard and known to those skilled in the art. Thus, to one skilled in the art, the process of the present invention enables the production of food of improved texture and properties without substantial additional expenditure for equipment and without damaging, for example, the color, taste, odor or nutritive value of the food. It is also within the scope of the invention to use the process described herein with "normal" meat or fowl instead of PSE meat or fowl in order to enhance the quality of the manufactured product produced by using such "normal" meat or fowl.

EXAMPLE 1

A brine solution comprising salt (NaCl), phosphates, TG at a level of about 0.02 unit TG/g meat protein, sugar, flavoring and liquid smoke is prepared. The resulting solution is injected into whole cuts or chunks of pig quadriceps muscle, and curing proceeds for 24–48 hours at a temperature of about 38° F. During the curing process, the meat chunks are tumbled for a period of about 5–6 hours. The tumbling may take place at any time during the curing process and may occur as a single time period or be divided into two or more smaller time periods which can be distributed during the overall curing process. The cured meat whole muscle cuts or chunks are then stuffed into a form or mould such as a can or polybag, sealed and cooked by ordinary procedures known to those skilled in the art to prepare a finished ham product.

The improvement in the ham product prepared using a TG containing brine solution for a chunk manufactured product is evidenced by less cooking purge, improved binding of the pig muscle chunks in the finished product and firmer texture of the product relative to a product prepared without the use of TG.

EXAMPLE 2

Pig quadriceps muscle cuts or chunks, at least some of which exhibit PSE characteristics, are cured using a TG containing solution, stuffed into containers and cooked by otherwise ordinary procedures as described in Example 1. The improvement in the ham product thus prepared is evidenced by less cooking purge, improved binding of the muscle chunks and firmer texture of the product relative to a product prepared without the use of TG.

EXAMPLE 3

Pig quadriceps muscle cuts or chunks are cured as described in Examples 1 and 2, and are stuffed into smoke and moisture permeable containers such as, for example, smoke permeable polybags. The resulting product is then cooked and/or smoked by otherwise ordinary procedures known to those skilled in the art to give a smoked ham product having improved binding characteristics between the muscle chunks and a firmer texture relative to a product prepared without the use of TG.

EXAMPLE 4

Turkey breast chunks are treated by the procedure as described in Example 1. The improvement is in less cooking purge, improved binding of the turkey chunks in the finished product, and firmer texture of the finished product relative to product prepared without the use of TG.

EXAMPLE 5

Whole cuts or chunks of turkey breast are treated by being tumbled with an aqueous solution including TG. After curing at a temperature of about 38° F. for about 24–48 hours, the turkey breast chunks are stuffed into a form or mould, for example, cans or polybags, sealed and cooked by ordinary procedures known to those skilled in the art.

The improvement in the turkey breast product prepared using a TG containing water solution is evidenced by less cooking purge, improved binding of the turkey breast chunks in the finished product and firmer texture of the product relative to a product prepared without the use of TG.

EXAMPLE 6

Turkey breast chunks are cured in aqueous solution comprising TG as described in Example 4. The chunks are stuffed into smoke and moisture permeable containers and cooked and/or smoked by otherwise ordinary methods known to those skilled in the art to give a smoked turkey breast product having improved binding between the turkey breast chunks and firmer texture relative to a product prepared without the use of TG.

It will be understood that the embodiments of the present invention which have been described are illustrative of some of the applications of the principles of the present invention. Numerous modifications may be made by those skilled in the art without departing from the true spirit and scope of the invention.

We claim:

1. A process for lessening, repairing or reversing the PSE characteristics in meat, said process comprising treating a meat source having PSE characteristics with an aqueous solution consisting essentially of a selected quantity of transglutaminase at a temperature and for a time sufficient to lessen, repair or reverse the PSE characteristics of said meat source, said treating being prior to a curing procedure which includes cooking and/or smoking said meat source.

2. The process according to claim 1, wherein said treating includes subjecting said meat source to said transglutaminase-containing solution for a time in the range of about 5 minutes to about 160 hours and at a temperature in the range of about 32–45° F.

3. The process according to claim 2, wherein said selected quantity of transglutaminase in the aqueous solution is in the range of about 0.005–10.0 units transglutaminase per gram of meat protein.

4. The process according to claim 3, wherein said selected quantity of transglutaminase in the aqueous solution is in the range of about 0.02–5.0 units per gram of meat protein, the time is in the range of about 24–80 hours, and the temperature is between about 36° F. and 40° F.

5. The process according to claim 1, wherein said selected quantity of transglutaminase in the aqueous solution is in the range of about 0.02–5 units per gram of meat protein.

6. The process according to claim 1, wherein said meat source is a whole muscle cut or chunk.

7. A process for the production of a manufactured meat or fowl product from a meat or fowl source having PSE characteristics, said process comprising lessening, repairing or reversing PSE characteristics of a meat or fowl source of whole muscle, whole cut or chunk PSE meat by: treating said PSE meat or fowl source at a selected temperature and for a selected time with an aqueous solution consisting essentially of a selected quantity of transglutaminase, stuffing the thus treated meat or fowl source into a container, and cooking and/or smoking said meat or fowl source in said container to form a manufactured meat or fowl product.

8. The process according to claim 7, wherein the quantity of transglutaminase in said aqueous solution is in the range of about 0.005–10 units per gram of meat and protein.

9. The process according to claim 7, wherein the quantity of transglutaminase in said aqueous solution is in the range about 0.02–5.0 units per gram of meat and protein.

10. The process according to claim 9, wherein said selected temperature is about 36° F. to about 40° F., and said selected time is in the range of about 24–48 hours.

11. The process according to claim 7, wherein said selected temperature is about 32–45° F., and said selected time is in the range of about 5 minutes to about 160 hours.

12. A process for the production of a manufactured meat or fowl product from a PSE meat source which exhibits pale, soft and exudative characteristics, said process comprising treating said PSE meat source at a selected temperature and for a selected time with an aqueous solution consisting essentially of a selected quantity of transglutaminase sufficient to reverse the pale, soft, exudative characteristics in forming a manufactured meat or fowl product.

13. The process according to claim 12, further including stuffing said PSE meat source into a container after said treating has been initiated and cooking and/or smoking said meat source in said container to obtain said manufactured meat or fowl product.

14. The process according to claim 13, wherein the quantity of transglutaminase in said aqueous solution is in the range of about 0.02–5.0 units per gram of meat protein in said PSE meat source.

15. The process according to claim 14, wherein said temperature is between about 36° F. and about 40° F.

16. The process according to claim 12, wherein the quantity of transglutaminase in said aqueous solution is in the range of about 0.005–10 units per gram of meat protein in said PSE meat source.

17. A process for the production of a manufactured, cooked and/or smoked ham or turkey breast product from fresh porcine muscle or turkey breast meat which exhibit PSE characteristics, said process comprising treating said PSE porcine muscle or turkey breast meat at a temperature in the range of about 32–45° F. and for a selected time in an aqueous solution consisting essentially of a selected quantity of transglutaminase sufficient to lessen said PSE characteristics, stuffing said meat into a container or mould, and cooking and/or smoking the cured meat in said container or mould to obtain a cooked and/or smoked manufactured ham or turkey breast product in which said PSE characteristics are lessened.

18. The process of claim 17, wherein said fresh meat is chunk porcine muscle or turkey breast.

19. The process of claim 17, wherein the quantity of transglutaminase used in the treating step is in the range of about 0.005–10 units per gram of meat protein.

20. The process of claim 19, wherein said quantity of transglutaminase is in the range of about 0.02–5.0 units per gram of meat protein.

* * * * *